Figure 1:
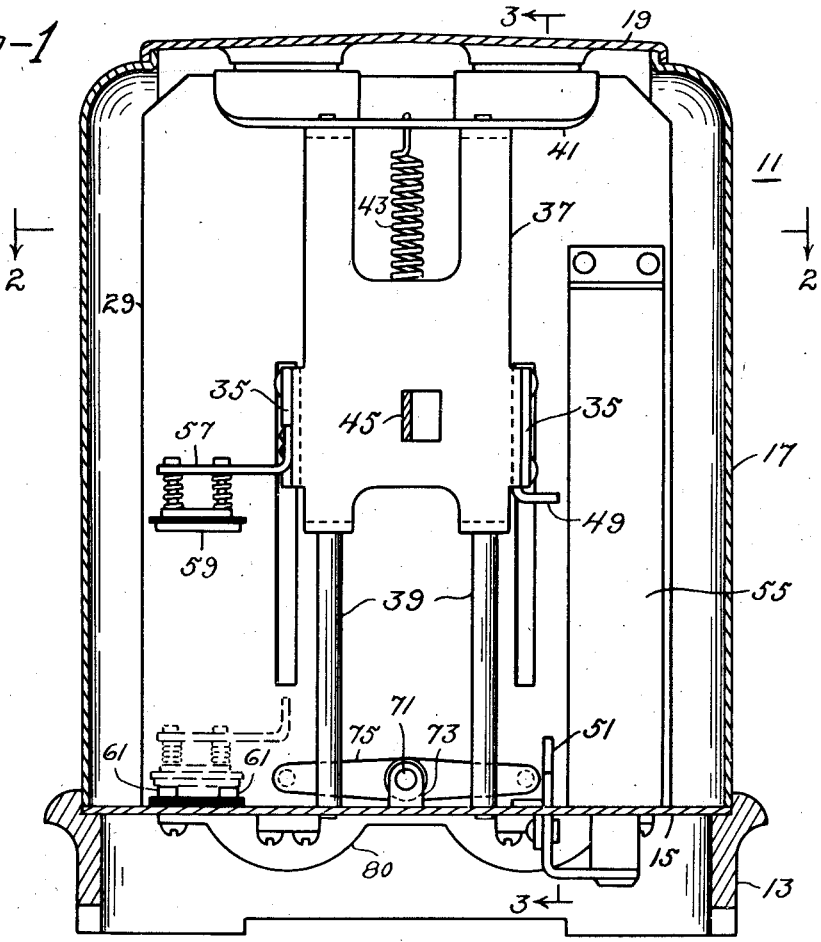

Aug. 28, 1945.    B. G. OLVING    2,383,673
ELECTRIC TOASTER
Filed Feb. 21, 1942    4 Sheets-Sheet 1

INVENTOR.
BROR G. OLVING
BY
ATTORNEY

Aug. 28, 1945.   B. G. OLVING   2,383,673
ELECTRIC TOASTER
Filed Feb. 21, 1942   4 Sheets-Sheet 2
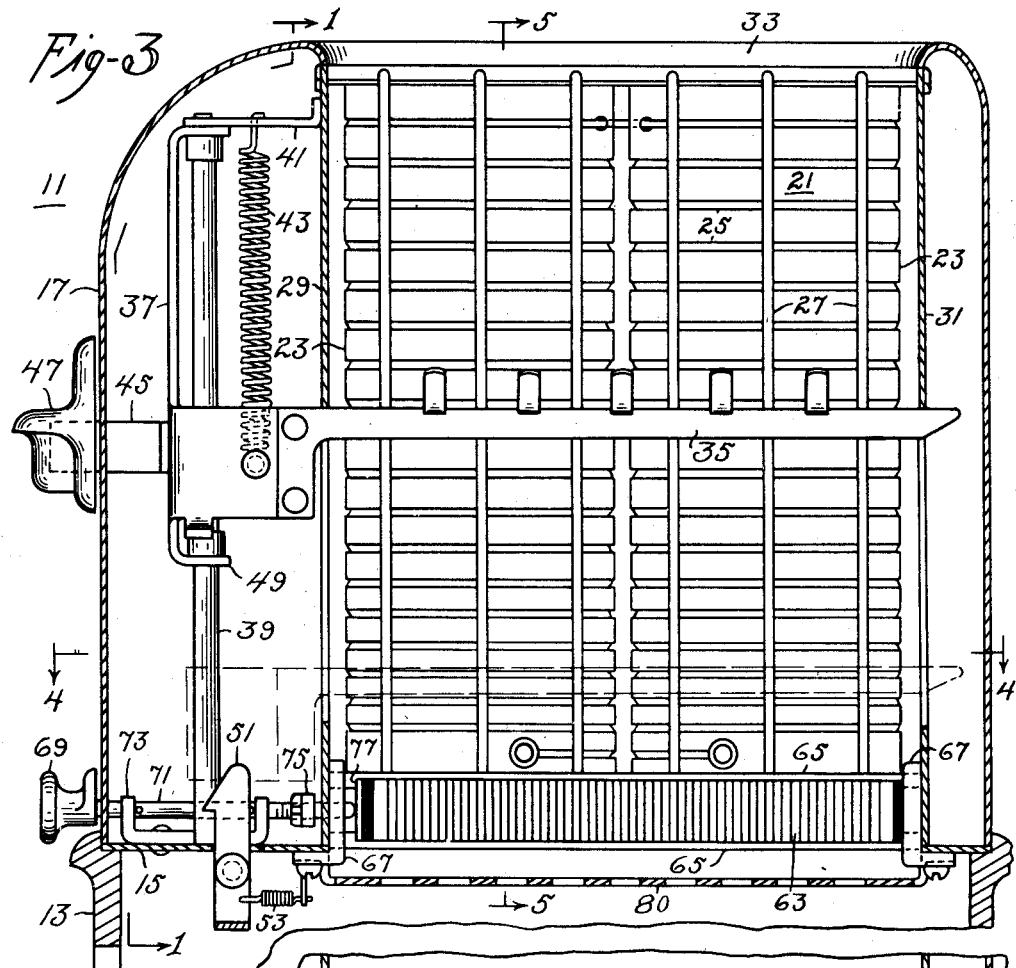
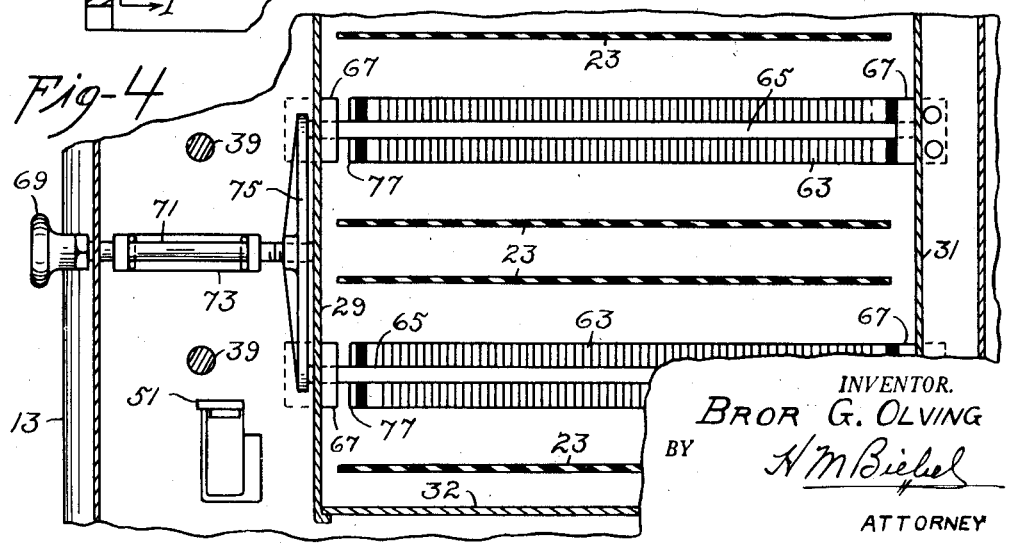
INVENTOR.
BROR G. OLVING
BY
ATTORNEY Aug. 28, 1945.    B. G. OLVING    2,383,673
ELECTRIC TOASTER
Filed Feb. 21, 1942    4 Sheets-Sheet 3
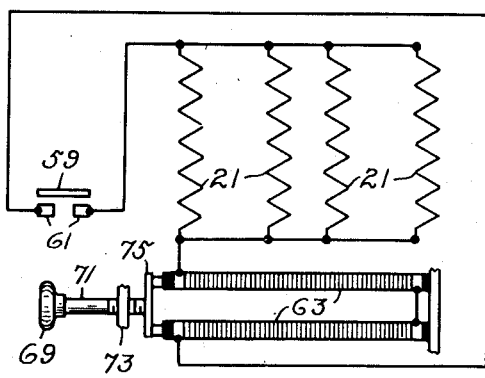
INVENTOR.
BROR G. OLVING
BY
ATTORNEY Aug. 28, 1945.  B. G. OLVING  2,383,673
ELECTRIC TOASTER
Filed Feb. 21, 1942  4 Sheets-Sheet 4
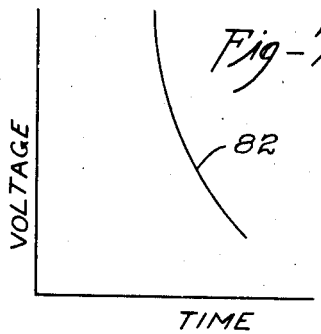
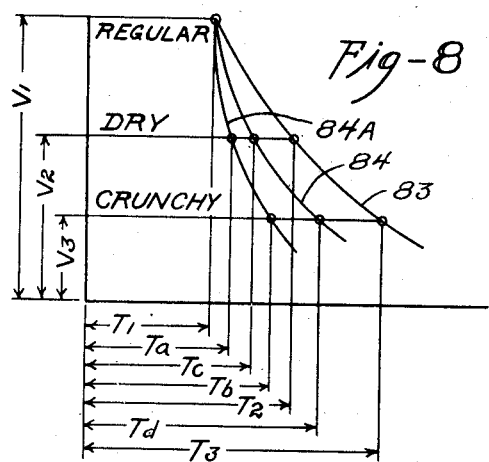
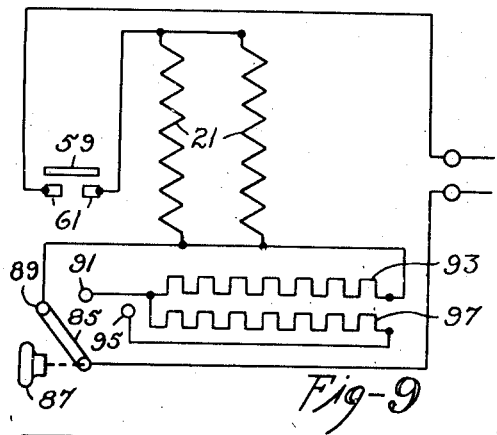
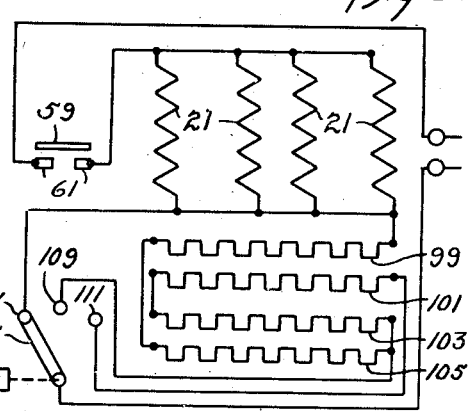
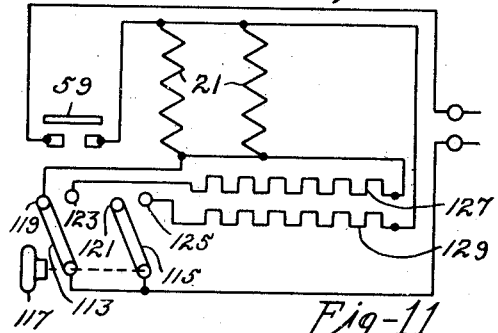
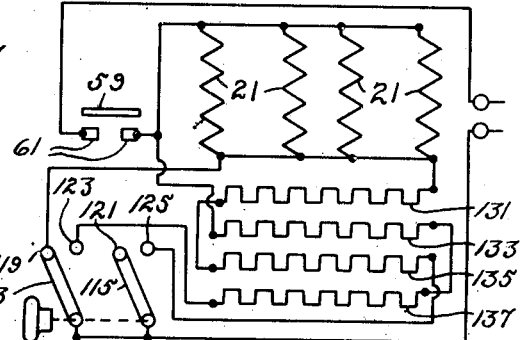
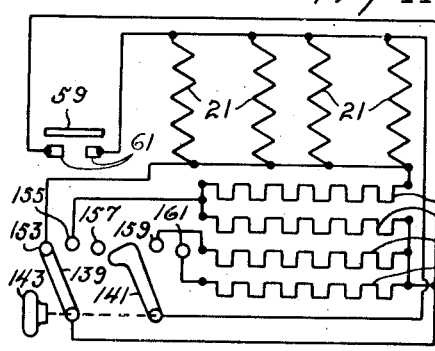
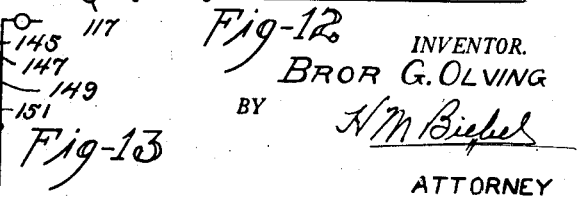
INVENTOR.
BROR G. OLVING
BY
ATTORNEY Patented Aug. 28, 1945

2,383,673

UNITED STATES PATENT OFFICE 2,383,673

ELECTRIC TOASTER

Bror G. Olving, Elgin, Ill., assignor to McGraw Electric Company, Elgin, Ill., a corporation of Delaware Application February 21, 1942, Serial No. 431,856

10 Claims. (Cl. 219—19)

My invention relates to electric cooking devices and particularly to electric toasters.

An object of my invention is to provide a relatively simple and efficient toaster for subjecting a slice of bread to different kinds of heat at the same time.

Another object of my invention is to provide a toaster which will permit of operating on a new and different method of toasting than that heretofore used.

Another object of my invention is to provide an electric toaster having operatively associated therewith a plurality of different electric heating elements to provide different kinds of heat at respectively different temperatures.

Another object of my invention is to provide an electric toaster in which a slice of bread is subjected to relatively high temperature radiant heat on both sides of the slice and, at the same time, to relatively low temperature convected heat applied to the two sides of the slice of bread, at the same time.

Another object of my invention is to provide an electric toaster having different electric heating elements therein to provide radiant and convected heat affecting the bread being toasted and having also control means to vary the ratio between the radiated and the convected heat reaching the bread being treated, the control means being actuable by the operator to vary the kind of toast produced.

Other objects of my invention will either be apparent from a description of one form of electric toaster now preferred by me or will be pointed out in the course of such description and set forth in the appended claims.

Figure 2:
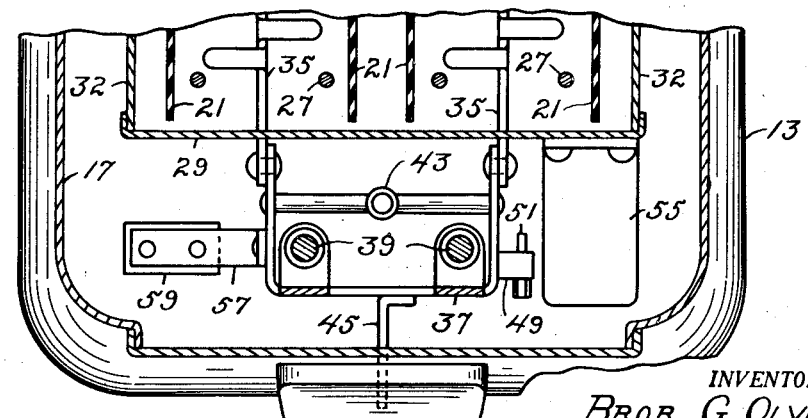

In the drawings,

Figure 1 is a vertical lateral section through a toaster embodying my invention taken on the line 1—1 of Fig. 3, Fig. 2 is a fragmentary horizontal sectional view therethrough taken on the line 2—2 of Fig. 1, Fig. 3 is a vertical longitudinal sectional view through a toaster embodying my invention taken on the line 3—3 of Fig. 1, Fig. 4 is a horizontal sectional fragmentary view taken on the line 4—4 of Fig. 3, Fig. 5 is a vertical lateral sectional view taken on the line 5—5 of Fig. 3, Fig. 6 is a diagram of the electric connections of the toaster shown in Figs. 3, 4 and 5, Fig. 7 is a curve showing certain relations between the voltage applied to the toast heating elements and the time required to obtain a given amount of surface browning, in toasters of the kind now employed, Fig. 8 is a view showing two curves, each similar to that shown in Fig. 7, to show one phase of operation effected by my improved toaster, Fig. 9 is a diagram of electrical connections of a toaster embodying my invention as applied to a single-slice toaster, Fig. 10 is a diagram of connections usable by me as applied to a two-slice toaster, Fig. 11 is a diagram of connections as applied to a single-slice toaster, Fig. 12 is a diagram of connections as applied to a two-slice toaster, and, Fig. 13 is a diagram of connections applicable to a two-slice toaster and embodying certain other elements included in my invention.

I have elected to show my invention as applied to a two-slice toaster of a make now being sold and a toaster assembly or structure is designated by the numeral 11. This structure includes a lower skeleton frame 13 which may be made of a suitable moulded composition and which frame has resting thereon a bottom plate 15 adjacent its upper face, which plate may be held in proper operative position against the frame 13 in any suitable or desired manner now well known in the art.

I provide also an outer casing 17 made of relatively thin suitable material having front, rear and two side walls open at its lower and at its upper end. The lower edges of the member 17 may rest upon the bottom plate 15 and be held thereagainst in any suitable or desired manner and I may provide an upper top or cover member 19, all in a manner well known in the art.

I provide a pair of spaced planar vertical heating elements 21 for each slice of bread which is adapted to be toasted, at the same time, in a toaster of this kind. These heating elements may include one or more sheets or plates 23 of electric insulating material such as mica, having wound thereon a strand 25 of resistor wire, all well known in the art. In order to properly space a slice of bread being toasted from the high temperature radiant heat of the resistor strand 25 I may provide guard or guide wires 27, also well known in the art.

I provide a front intermediate wall 29 and a rear intermediate wall 31, each of which may be made of sheet metal and which cooperate with the two outermost heating elements hereinbefore described to provide a toasting chamber. The bottom plate 15 is provided with relatively large openings, one beneath each slice of bread as shown in Fig. 3 of the drawings, in order to permit of convection currents of air flowing through the toasting chamber, this air entering at the bottom through the perforated bottom plate 15 and leaving at the top of the toaster through openings 33 in the top member 19 which openings 33 are adapted to have slices of bread inserted therethrough and the toasted slices of bread removed therefrom after toasting.

I provide further bread carriers 35 vertically reciprocally movable each between the cooperating pair of spaced heating elements and in the case of a two-slice toaster, as shown in the drawings, the front end portions of the respective bread carriers 35 may be mechanically secured to a carriage plate 37 so that when this carriage plate is moved upwardly and downwardly, the carriers and slices of bread thereon, if any, will be moved therewith.

To properly guide the carriage 37 I provide two vertical standards 39 the lower ends of which may interfit with the bottom plate 15 and the upper ends of which may be held in proper operative position by a sheet metal bracket 41 secured against the front intermediate wall 29. It is desired to yieldingly bias the bread carriers into their upper non-toasting position which is substantially that shown in Fig. 3 of the drawings and for this purpose I provide a coil spring 43 the lower end of which is connected with the carriage 37 and the upper end of which is connected with the bracket 41. Carriage 37 is provided with a forwardly extending projection 45 adapted to extend through a slot in the front wall of casing 17 and to have an actuating knob 47 secured thereto which knob is adapted to be pressed downwardly by an operator, after a slice of bread has been placed upon a carrier 35, to move the carrier and the slice of bread thereon into the lower toasting position within the toasting chamber.

As it is further desired to hold the carrier and a slice of bread thereon in the lower toasting position and then to cause return of the carrier and the slice of bread thereon into the upper non-toasting position after a preset length of time, the carriage 37 may be provided with a laterally projecting latch 49 which latch is adapted to engage with and be held by the upper hook-shaped end 51 of a detent which detent may be pivotally supported by the front end portion of bottom plate 15 and which detent may be yieldingly biased into its proper operative interengaging position by a coil spring 53.

I have shown also a mechanical timer 55 which may be of the kind disclosed and claimed in Ireland Patent No. 1,866,808 although I do not desire to be limited thereto since the function and operation of the timer is to effect disengagement of the detent 51 from the latch 49 at the end of a toasting operation. While I have not shown means on the mechanical timer 55 and the carriage 37 for causing winding up of the power spring, I have not considered this as necessary in view of the fact that this constitutes no part of my invention and further, that any other kind of timer may be employed the only consideration being that movement of the carrier and a slice of bread thereon into toasting position will effect energization or conditioning of the timer so that it will begin to operate to determine the length of a toasting operation.

In order to cause energization of the heating element 21 I provide a projection or lug 57 on the carriage 37 which yieldingly and insulatedly supports a contact bridging member 59 which bridging member is adapted to engage two fixed contact members 61 insulatedly supported on the bottom plate 15 to the effect that when the carrier and a slice of bread thereon have been moved into the lower toasting position, the heating elements 21 will be energized to provide high temperature radiant heat for effecting surface toasting of a slice of bread on the carrier.

Generally speaking, I have thus far described a relatively standard form of automatic electric toaster in which only high temperature radiant heat is generated to effect surface toasting or browning of both sides of a slice of bread at the same time.

My invention adds to a toaster of this general kind additional heating elements located in a definite position relatively to the slice of bread, namely, spaced therefrom and therebelow so that when these additional heating elements are energized by the operator, convection currents of heated air but of a temperature relatively lower than the temperature of the radiant heat, will be caused to flow upwardly past both sides of a slice of bread on the carrier. These two kinds of heat, namely, radiant and convected heat, are or may be applied simultaneously to a slice of bread so that it is possible to obtain, at the will of an operator, a slice of bread of the regular kind, that which is surface toasted or browned only or one which has been dried out to a lesser or a greater degree. By drying out I mean that the convected currents of hot air flowing past both sides of a slice of bread while it is subjected to high temperature radiant heat will cause a drying out of the inner portion part or mass of a slice of bread the degree of penetration of this drying out or baking increasing, of course, with the length of time during which a slice of bread is subjected to the convected heat. An intermediate degree of baking or drying out may be called "dry" and when a slice of bread has been subjected to radiant heat and to convected heat for a relatively long time or longer than would be necessary to obtain a dry piece of bread, the condition which the bread has reached may then be called "crunchy" condition.

I desire to point out here that one of the effects of such convected heat applied to a slice of bread is to add to the surface toasting of the slice of bread so that if such convected heat is applied to a slice of bread which would otherwise be subjected to the radiant heat only for a length of time to make say medium brown toast, it is possible that the color may be a dark toast, it being understood that the three different conditions of surface toasting may be designated as light, medium and dark.

In order to obtain this convected heat I may provide an additional or auxiliary heater which, in the form shown more particularly in Figs. 3, 4 and 5, may comprise a number of disks 63 of a carbonaceous material now used in the electric art for certain types of resistor members. These disks may be on the order of ⅜" or ½" in diameter and may be supported below the slice of bread on a carrier 35 as by bars or rods 65 interfitting in peripheral recesses in the respective disks 63, the rear ends of these bars being supported by brackets 67 which may be supported on the bottom plate 15, as shown in Fig. 3 of the drawings. It is, of course, to be understood that suitable electric insulating members are provided to ensure flow of the current through the set or stack of disks 63. I desire to vary the resistance introduced in a circuit including these stacks of disks and for this purpose I provide a knob 69 at the front of the toaster casing which knob is mounted on a shaft 71 which shaft is carried by a bearing member 73. The rear end of the shaft 71 engages a cross bar 75 which engages compression members 77 adapted to engage the front end of the stack or series of resistor disks 63 so that turning movement of knob 69 and of shaft 71 will cause different degrees of compression to be applied to the series of resistor disks 63. As is well known in the art, such series or stacks of resistor disks 63 will have relatively very small resistance when tightly compressed but the resistance will be greatly increased with reduction of the pressure applied to said series of disks as by means of the knob 69 and the shaft 71.

A resistance structure of this kind which is manually operable is, therefore, effective, at the will of an operator, to vary the degree of electrical energy translated into heat in the auxiliary heating elements which heat is effective to provide or generate convection currents of air shown generally by the arrows 79 in Fig. 5 of the drawings as flowing upwardly through a perforated protection cover plate 80, past the two sides of a slice of bread 81, shown as being held in proper operative position by the guard wires 27. It is, therefore, possible to easily and quickly vary the amount of heat applied in the form of convected heat against or on the two sides of a slice of bread and it is, of course, to be noted that when the resistance of the auxiliary or additional heating element comprising the resistor disk 63 is increased, the amount of electrical energy translated into heat in the main toasting elements 21 will be decreased as the resistance in the auxiliary heating element is increased.

Fig. 6 of the drawings shows the diagram of connections which I prefer to employ and it is to be noted that this refers to a two-slice toaster such as shown more particularly in Fig. 5 of the drawings and while the electrical connectors necessary to obtain this diagram of connections have not been specifically shown in the other drawings, it is considered unnecessary to do so since the means required are already well known in the art.

Referring to Fig. 7, I have there shown a curve 82 pertaining to a conventional toaster now on the market, which curve illustrates in a general way the length of a toasting period to obtain a given degree of toasting or browning of similar slices of bread when the voltage supplied to the toast heating elements varies for any reason. One of these reasons is poor voltage regulation in the power house, substation or at the distribution center or abnormally large temporary loads on the circuit. A higher energizing voltage applied to the toast heating elements will require a shorter toasting operation period than if the energizing voltage is low.

Referring now to the right-hand curve 83 in Fig. 8, I have shown by this curve the voltage-time characteristic of a toast conditioner which can be made by connecting a voltage controller, of any kind now well known in the art, in circuit with the toast heating elements of a toaster now on the market, to be able to reduce the voltage applied to the toast heating elements. Such controller may be separate from the toaster, that is any electrical energy translated into heat is not applied to the slice of bread being toasted. It is possible to obtain regular, dry or crunchy toast by adjusting the controller to reduce the voltage applied to the toast heating elements, to thereby reduce the amount and the temperature of the heat generated in the toast heating elements. If a voltage of $V_1$ be applied to the toast heating elements, which may be a normal line voltage of 115 volts, the time required to obtain regular toast of medium brownness will be $T_1$. If, now, dry toast of medium brownness is desired the voltage applied to the toast heating elements may be $V_2$ and the time length of the toasting operation will be $T_2$. For illustrative purposes it may be considered that $V_2$ will be about 105 volts. If crunchy toast of medium brownness is desired a voltage of $V_3$ may be applied to the toast heating elements and the time period of a toasting operation will be $T_3$.

For illustrative purposes only it may be considered that $V_3$ will be about 95 volts and it is to be noted that the several voltage values are not to be considered in a limiting sense but merely for illustration.

Curve 82 in Fig. 7 illustrates the voltage-time characteristic for a uniform degree of browning of a slice of bread when the toast heating elements are subjected to a limited uncontrolled range of line voltage fluctuation. Curve 83 in Fig. 8 illustrates the voltage-time characteristic for a uniform degree of browning over a controlled range of voltage variation.

Curve 84 in Fig. 8 shows the voltage-time characteristic of a toaster embodying my invention, the diagram of connections of which is shown in Fig. 6. In my improved toaster when the amount of electric energy supplied to the main toast heating elements is reduced, as by use of the disks 63, the heat generated in the auxiliary heater comprising the disks 63, is applied to the slice of bread being toasted. The result is that the time period required to make a dry piece of toast of medium brownness is less than the time $T_2$ and and may be represented by $T_c$. Also instead of a time $T_3$ to make crunchy toast of medium brownness on a toaster using only the heat from the toast heating elements, the time is now less and is represented by $T_d$. It is, of course, understood that the amount of electrical energy translated into heat in the main toast heating elements and the auxiliary heating element (represented by the disks 63 connected in series electric circuit with the toast heating elements 21) is less than if the whole line or supply circuit voltage is applied to the toast heating elements.

In a modification of my invention, the details of which will be hereinafter described, I may use additional auxiliary electric heaters, connected to the supply circuit, as well as the series connected auxiliary electric heaters, so that the total amount of electric energy translated into heat in the toaster and affecting the slice or slices of bread in the toaster will be substantially constant throughout the range of control or the total amount of electric energy translated into heat may even increase when the control is adjusted to obtain dry or crunchy toast.

The voltage-time characteristics of a toaster in which the wattage expended in the various heating elements remains substantially constant or is increased is shown in curve 84A of Fig. 8. The voltage applied to the main toast heating elements is $V_1$, the same as before and all electric energy expended in the toaster is translated into heat in the main toast heating elements and a regular piece of toast of medium brownness will be obtained. If now a dry piece of medium brown toast is desired, the operator will adjust the control means to apply a voltage of $V_2$ to the main toast heating elements and to expend in the auxiliary electric heaters below the slice or slices of bread an amount of electric energy which added to that expended in the main toast heating elements will make the total amount of electrical energy expended substantially the same as or even slightly greater than in the case of when regular toast was made. It will be noted that the time required to make dry toast under the last described conditions will be $T_a$ and this time is less than $T_c$ and also less than $T_2$. This difference of time is explained by the differences in the total amount of electrical energy translated into heat in the heating elements in the toaster.

If crunchy toast of medium brownness is desired, the control will be adjusted to apply a voltage of $V_3$ to the main toast heating elements and a time of $T_b$ will be required to produce such toast. This time $T_b$ is less than the time $T_d$ and much less than the time $T_3$, for the same reason as set forth above. It has already been pointed out that the device shown in Figs. 1 to 6 inclusive discloses a relatively simple form of control in which a compressible resistor is electrically connected in series circuit relation with the toast heating elements 21 and in which means are provided to increase the resistance of the auxiliary heater and therefore to decrease the voltage drop in the main heating elements 21, all as hereinbefore described. It is to be noted that the control means above described permits of varying the ratio of the amount of radiant heat reaching the bread to the amount of convected heat reaching the bread.

I have found it possible, however, to provide relatively simple means in a toaster embodying my invention by which it is possible to connect in series circuit with the main heating elements 21, fixed resistors and preferably plural-section resistors. The electrical connections effected when using such fixed resistors are that initially, at the will of an operator, no convected heat is obtained, that is, all of the energy expended in the toaster and translated into heat therein will be effected in the heating element 21. In order to obtain a dry piece of toast, I may move the control for the auxiliary convected-heat heating elements to a position where one section of the auxiliary heater is connected in series electric circuit with the main heaters and when I desire to obtain crunchy toast, the control may be moved to a further position where two such auxiliary heaters are connected in series electric circuit with each other and with the main heaters 21.

Reference to Fig. 9 of the drawings will show a relatively simple means for obtaining such a control and including a manually movable switch arm 85 adapted to be operated or turned by a knob 87, which knob may take the place of knob 69 hereinbefore described. When regular toast of any desired degree of brownness is desired, the arm 85 will engage a fixed contact button 89 which is electrically connected as shown in Fig. 9 of the drawings, to one terminal of the set of main toast heating elements 21. When arm 85 is moved into engagement with a second fixed contact member 91, the first section 93 of a two-section heater will be engaged, which first section 93 is connected to be in series circuit relation relatively to the main heaters 21. Depending upon the amount or value of the resistance in auxiliary heater 93, a certain amount of electrical energy will be translated into heat in resistor 93 and a certain amount of electrical energy will be translated into heat in the main heating elements 21 and it is, of course, obvious that the total amount of electric energy now translated into heat will be less than when only the heating elements 21 are energized.

If I desire to increase the amount of electrical energy expended in the auxiliary electrical heaters generating convected heat for affecting the slice of bread, the switch arm 85 is moved into engagement with fixed contact 95 whereby the second section 97 of the auxiliary heating element is connected in electrical series circuit with the first section 93 and with the main heating elements 21 whereby the total amount of electric energy translated into heat in the toaster is decreased, the amount of radiant heat energy affecting both sides of a slice of bread is also decreased and the amount of convected heat applied to both sides of a slice of bread is increased over that applied thereto when only one section 93 is energized.

Referring now to Fig. 10 of the drawings, I have there shown a diagram of connections substantially similar to that shown in Fig. 9 but as is necessary for a two-slice toaster in which two slices of bread may be heat-treated simultaneously.

In a toaster of this kind I provide two auxiliary heating elements located below each of the two slices of bread, sections 99 and 101 being located below one slice of bread and sections 103 and 105 being located below the other slice of bread. It is, of course, to be understood that any suitable or desired construction of these lower auxiliary heating elements may be employed and for example, they may be wound upon a flat bar or rod of electric insulating material having a length substantially that of the lower edge of the slice of bread being toasted. Since such heating elements, as to details of construction, are well known in the art, I have not considered it necessary to illustrate the construction thereof in detail.

When the arm 85 is in engagement with the first fixed contact member 107, the main heating elements 21 only will be energized and any degree of coloring or browning of the surface toasting may be obtained by proper presetting of the timing mechanism hereinbefore described. The degree of dryness obtained under such conditions of operation will, therefore, be what has been termed hereinbefore "regular" toast. When it is desired to obtain dry toast, arm 85 is moved to fixed contact member 109 which causes sections 105 and 99 to be connected in series circuit relation relatively to the main heating elements 21 and the result will be that a given amount of convected heat is generated and the total amount of heat applied by the main heating elements 21 is somewhat reduced, all as hereinbefore described. When it is desired to obtain crunchy toast, arm 85 is moved into engagement with contact member 111 which causes the connection of sections 101, 103, 105 and 99 to be connected in series circuit with each other and with the main heating elements 21 whereby the total amount of electrical energy translated into heat in the toaster is reduced but the slice of bread is subjected to a greater degree of convected heat so that crunchy toast, as hereinbefore defined, will be obtained. To obtain this result it is only necessary to use auxiliary electric heaters having the proper resistances.

Referring now to Fig. 11 of the drawings, I have there illustrated a modified form of control of a pair of auxiliary heaters whereby regular and say dry toast of any desired degree of color may be obtained. For this purpose I provide two switch arms 113 and 115, both of which are simultaneously caused to turn by a knob 117. In the position shown in Fig. 11 of the drawings, arm 113 is in engagement with a fixed contact member 119 which is connected to one terminal of the main heating elements 21. The other switch arm 115 may engage a fixed contact member 121 which, however, is not electrically connected to any part of the electric circuit of the toaster. When arms 113 and 115 are in the positions shown in Fig. 11, the main heating elements 21 only will be energized so that a regular piece of toast will be obtained of any desired degree of brownness.

When it is desired to obtain say dry toast, knob 117 is turned to cause arm 113 to engage a fixed contact member 123 and arm 115 to engage a fixed contact member 125 so that one section 127 of the auxiliary heating element will be electrically connected in series circuit relation with the main heating elements 21 and a second section 129 of the auxiliary heating element will be connected across the supply circuit or in parallel with the main heating elements 21 and the auxiliary heating section 127 so that the full supply circuit voltage is applied to section 129. It is obvious that the resistance of this section 129 may be made such that the amount of electrical energy translated into heat therein will be such that the total amount of heat supplied by the main heating elements 21 and the sections 127 and 129 will be substantially the same as is the case when heating elements 21 only are energized.

Referring now to Fig. 12 of the drawings, I have there illustrated a diagram of connections applicable to a two-slice toaster in which I provide two sections of auxiliary heating elements for each slice of bread. I provide further a double pole switch having arms 113 and 115 simultaneously adjustable by a knob 117 to control the connection of sections 131, 133, 135 and 137 in the energizing circuit, as will now be described. When arm 113 is in engagement with fixed contact member 119 and arm 115 is in engagement with fixed contact member 121, the main heating elements 21 only are energized so that regular toast of any desired degree of brownness will be obtained without any appreciable degree of deeper drying out or baking of the slices of bread from convected heat.

When knob 117 is turned to cause arm 113 to move into engagement with contact member 123, and arm 115 to move into engagement with contact member 125, the following result or effect will be obtained. Section 137 will be connected in series circuit relation with section 133 whereby these two sections, connected in series circuit with each other, will be connected across the energizing circuit applied to the toaster. Further, the sections 135 and 131 will be connected in series circuit relation relatively to each other and to the main heating elements 21. This means that one section of auxiliary heating element under each of two slices of bread are connected in series circuit relation to each other and to the main toast heating elements while, at the same time, one section of the auxiliary heating element under each of two slices of bread are connected in parallel therewith whereby, as noted above, it is possible to maintain substantially a constant amount of electric energy translated into heat so that it is possible to obtain baked or dried out toast of a certain degree in a shorter time than would be possible if the auxiliary heating elements connected across the energizing circuit were not provided.

Referring now to Fig. 13 of the drawings, I have illustrated a two-slice toaster in which I provide control means which will permit of obtaining three different degrees of baking or drying out of a slice of bread, namely, regular, dry and crunchy, at the will of an operator.

I provide a first switch arm 139 and a second switch arm 141 adapted to be moved or turned simultaneously by a knob 143. I provide further a pair of sections 145 and 147 for the first of two slices of bread and a section 149 and a second section 151 for the second slice of bread. I provide further three fixed contact members 153, 155 and 157 adapted to be selectively engaged by switch arm 139 and I provide further two fixed contacts 159 and 161 adapted to be engaged either singly or simultaneously by the properly shaped switch arm 141.

When the control means including the knob 143 is in the position shown in Fig. 13 of the drawings, only the main radiant-heat heating elements 21 are energized so that the full voltage of the supply circuit is applied thereto and it will be noted that certain sections of the auxiliary heaters, namely sections 145 and 147, are short circuited and it is to be noted that sections 145 and 147 are so positioned as to be located below one slice of bread in a two-slice toaster while sections 149 and 151 are located below the second slice of bread in a two-slice toaster.

Let it be assumed now that knob 143 is turned to cause arm 139 to engage a fixed contact member 155 and to cause arm 141 to engage fixed contact member 159. It will be noted that now section 145 under the first slice of bread is connected in series circuit relation relatively to the main heating elements 21 and that section 149 under the other slice of bread is connected across the energizing circuit and therefore subjected to the full line voltage. It is, of course, desirable to make the resistance of section 149 such that the amount of electrical energy translated into heat therein will be substantially the same as that translated into heat in section 145 when this section is connected in series electric circuit with the main heaters 21.

Let it now be assumed that the operator turns knob 143 to cause arm 139 to engage fixed member 157 and to cause arm 141 to simultaneously engage contact members 159 and 161. Under this condition, sections 145 and 147 of the auxiliary heaters will be connected in series circuit relation to each other and to the main electric heaters 21 while sections 149 and 151 are simultaneously energized by being connected across the supply circuit conductors. It is, therefore, evident that the amount of energy translated into heat in sections 145 and 147 is greater than that translated into heat when only section 145 is connected in circuit. The total amount of electric energy translated into heat in the heating elements 21, 145, 149, 147 and 151 when energized at the same time may be equal to or greater than when heating elements 21, 145 and 149 only are energized, but it is to be noted that the ratio of the radiated to the convected heat is different. Under these conditions a crunchy piece of toast of the desired degree of surface toasting or browning will be obtained.

It is to be noted that the device embodying my invention provides, in all of its various forms hereinbefore described and shown in the drawings, relatively simple and easily acceptable means for simultaneously affecting by different kinds of heat, the toasting surfaces of a slice or slices of bread and that it is possible by providing suitable graduating marks on the timer and on the dryness controller to obtain the desired degree of color and the desired degree of dryness in a slice of bread subjected to my improved toaster.

Various modifications may be made in the structure embodying my invention without departing from the spirit and scope thereof and all such modifications clearly coming within the appended claims are to be considered as being covered thereby.

I claim as my invention:

1. An electric toaster comprising means for supporting a slice of bread in a fixed substantially vertical position, an electric heating element at each side of the slice of bread to effect surface toasting of both sides of the slice of bread by radiant heat, additional electric heating elements below the slice of bread to simultaneously effect drying out of the slice of bread by hot air flowing along the sides of the slice of bread and manually actuable control means for causing one of said additional electric heating elements to be connected in series electric circuit with said first mentioned electric heating elements to effect a decrease in the temperature and amount of radiant heat and to cause an upward flow of hot air along both sides of the slice of bread and the other to be connected directly across the line.

2. An electric toaster comprising means for supporting a slice of bread in a fixed substantially vertical position, an electric heating element at each side of the slice of bread to effect surface toasting of both sides of the slice of bread by radiant heat, a plurality of additional electric heating elements below the slice of bread adapted when energized to cause convection currents of heated air to flow past the sides of the slice of bread and manually actuable control means effective in one position to connect one of said additional heating elements in series electric circuit with said first mentioned heating elements and another of said additional heating elements in parallel electric circuit with said first mentioned heating elements and said one additional heating element and effective in another of its positions to connect two of said additional heating elements in series circuit with each other and the first mentioned heating elements and to connect two other of said additional heating elements in parallel electric circuit with said first mentioned heating elements and said two additional heating elements.

3. An electric toaster comprising means for supporting a slice of bread in a fixed substantially vertical position, an electric heating element at each side of the slice of bread to effect surface toasting of both sides of the slice of bread by radiant heat, a plurality of additional electric heating elements below the slice of bread adapted when energized to cause convection currents of heated air to flow past the sides of the slice of bread and manually actuable control means effective in one position to connect one of said additional heating elements in series electric circuit with said first mentioned heating elements and another of said additional heating elements in parallel electric circuit with said first mentioned heating elements and said one additional heating element.

4. An electric toaster comprising means for supporting a slice of bread on edge in a fixed substantially vertical position, an electric heating element at each side of the slice of bread to effect surface toasting of both sides of the slice of bread simultaneously by radiant heat, another electric heating element below the slice of bread to simultaneously effect drying-out of the slice of bread by convection currents of hot air moving upwardly past both sides of the slice of bread at the same time, said other heating element being connected in series electric circuit with said first mentioned heating elements and manually actuable control means for said heating elements to cause a variation of the resistance of the lower heating element between desired limiting values to effect a decrease in the temperature and amount of radiant heat produced by said first mentioned heating elements and to effect an increase in the temperature, volume and velocity of the upwardly moving convection currents of hot air flowing along both sides of the slice of bread.

5. An electric toaster comprising a plurality of electric heating elements adapted to simultaneously apply a plurality of different forms of heat transfer to both sides of a slice of bread, the heat from two of said elements being transferred substantially all in the form of radiant heat and the heat from another element being transferred substantially all in the form of convected heat and means for inversely varying the amounts of heat thus transferred.

6. An electric toaster comprising electric heating elements respectively at each side of and below a slice of bread for respectively simultaneously applying radiant and convected forms of heat transfer to both sides of a slice of bread and manually operable means for inversely varying the rates of heat transfer from the respective heating elements to the slice of bread.

7. An electric toaster comprising a plurality of simultaneously operable electric heating elements, positioned respectively at both sides of and below a slice of bread, adapted to subject both sides of a slice of bread to a plurality of different forms of heat transfer, substantially all of the heat from a pair of elements being transferred by radiation and substantially all of the heat from another element being transferred by convection and manually actuable control means to change the ratio of said different forms of heat transfer relatively to each other while the sum of said different forms of heat transferred remains substantially the same.

8. An electric toaster for simultaneously toasting and drying a slice of bread and for varying the degree of drying thereof independently of the degree of toasting, comprising a plurality of electric heating elements positioned respectively at both sides of and below a slice of bread, substantially all of the heat from the side heating elements being transferred by radiation to toast the bread and substantially all of the heat from the heating element below the slice of bread being transferred by convection to dry the bread and control means for reducing the amount of radiated heat reaching the slice of bread and for simultaneously increasing the amount of convected heat reaching the slice of bread.

9. An electric toaster for simultaneously toasting and drying a slice of bread and for varying the degree of drying thereof independently of the degree of toasting, comprising a plurality of electric heating elements positioned respectively at both sides of and below a slice of bread, substantially all of the heat from the side heating elements being transferred by radiation to toast the bread and substantially all of the heat from the heating element below the slice of bread being transferred by convection to dry the bread and manually actuable control means for said heating elements effective to cause the sum of the radiant and the convected heat produced by all of said heating elements when energized simultaneously to be substantially the same as the amount of radiant heat produced by the side heating elements when operating alone.

10. An electric toaster for simultaneously toasting and drying a slice of bread and for varying the degree of drying thereof independently of the degree of toasting, comprising a plurality of electric heating elements positioned respectively at both sides of and below a slice of bread, substantially all of the heat from the side heating elements being transferred by radiation to toast the bread and substantially all of the heat from the heating element below the slice of bread being transferred by convection to dry the bread and manually actuable control means for said heating elements effective to cause the amount of radiant heat from the side elements, when all of the elements are energized simultaneously to be appreciably less than that supplied by said side elements when energized alone.

BROR G. OLVING.